(12) United States Patent
Tokutomi

(10) Patent No.: US 10,987,880 B2
(45) Date of Patent: Apr. 27, 2021

(54) METHOD FOR MOLDING COMPOSITE MATERIAL AND JIG FOR MOLDING COMPOSITE MATERIAL

(71) Applicant: MITSUBISHI HEAVY INDUSTRIES, LTD., Tokyo (JP)

(72) Inventor: Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 154 days.

(21) Appl. No.: 16/331,120

(22) PCT Filed: Sep. 6, 2017

(86) PCT No.: PCT/JP2017/032140
§ 371 (c)(1),
(2) Date: Mar. 6, 2019

(87) PCT Pub. No.: WO2018/047869
PCT Pub. Date: Mar. 15, 2018

(65) Prior Publication Data
US 2019/0210306 A1   Jul. 11, 2019

(30) Foreign Application Priority Data

Sep. 7, 2016   (JP) .............................. JP2016-174714

(51) Int. Cl.
*B29C 51/10* (2006.01)
*B29C 70/48* (2006.01)
(Continued)

(52) U.S. Cl.
CPC .............. *B29C 70/48* (2013.01); *B29C 43/12* (2013.01); *B29C 43/14* (2013.01); *B29C 43/32* (2013.01);
(Continued)

(58) Field of Classification Search
None
See application file for complete search history.

(56) References Cited

U.S. PATENT DOCUMENTS

| | | | | |
|---|---|---|---|---|
| 5,648,109 A | * | 7/1997 | Gutowski | B29C 51/085 156/212 |
| 7,534,387 B2 | * | 5/2009 | Zenkner | B29C 70/342 264/313 |

(Continued)

FOREIGN PATENT DOCUMENTS

| | | |
|---|---|---|
| CN | 105073393 A | 11/2015 |
| JP | 2006-312260 A | 11/2006 |

(Continued)

OTHER PUBLICATIONS

Office Action in corresponding Chinese Application No. 201680070073.5, dated Aug. 12, 2019 (25 pages).

(Continued)

*Primary Examiner* — Edmund H Lee
(74) *Attorney, Agent, or Firm* — Osha Bergman Watanabe & Burton LLP

(57) ABSTRACT

A method for molding a composite material in which a curved corner is formed between two planes by using a molding jig includes: shaping a laminated body in such a manner that a thickness of the laminated body is decreased from an outer side toward an inner side of the corner, by using the molding jig in which the angle formed by the two planes is a first bending angle, the laminated body including fiber sheets laminated so as to have the corner curved at the first bending angle; and shaping the laminated body in such a manner that the thickness is decreased from the outer side toward the inner side by curving the corner so as to form a second bending angle, by using the molding jig in which the (Continued)

angle formed by the two planes is the second bending angle smaller than the first bending angle.

6 Claims, 3 Drawing Sheets

(51) Int. Cl.
| | |
|---|---|
| B29C 43/32 | (2006.01) |
| B29C 43/14 | (2006.01) |
| B29C 43/12 | (2006.01) |
| B29C 70/44 | (2006.01) |
| B29C 53/02 | (2006.01) |
| B29C 51/18 | (2006.01) |
| B29C 51/36 | (2006.01) |
| B29C 53/04 | (2006.01) |
| B29C 51/14 | (2006.01) |
| B29L 31/00 | (2006.01) |
| B29K 105/00 | (2006.01) |
| B29K 307/04 | (2006.01) |
| B29L 31/30 | (2006.01) |

(52) U.S. Cl.
CPC .............. *B29C 51/10* (2013.01); *B29C 51/14* (2013.01); *B29C 51/18* (2013.01); *B29C 51/36* (2013.01); *B29C 53/02* (2013.01); *B29C 53/04* (2013.01); *B29C 70/44* (2013.01); *B29C 70/443* (2013.01); *B29C 70/446* (2013.01); *B29K 2105/256* (2013.01); *B29K 2307/04* (2013.01); *B29L 2031/003* (2013.01); *B29L 2031/3076* (2013.01)

(56) References Cited

U.S. PATENT DOCUMENTS

| | | | | |
|---|---|---|---|---|
| 8,029,719 | B2* | 10/2011 | Petersson | B29C 53/025 |
| | | | | 264/316 |
| 9,573,301 | B2 | 2/2017 | Kline et al. | |
| 9,782,937 | B1 | 10/2017 | Modin et al. | |
| 9,782,958 | B2* | 10/2017 | Cano Cediel | B32B 37/0046 |
| 9,796,117 | B2* | 10/2017 | Feeney | B29C 70/545 |
| 10,059,065 | B2* | 8/2018 | Wadsworth | B29C 65/002 |
| 10,744,701 | B2* | 8/2020 | Shimono | B29C 53/80 |
| 10,807,282 | B2* | 10/2020 | Tokutomi | B29C 70/443 |
| 10,882,243 | B2* | 1/2021 | Erickson | B29C 53/84 |
| 2006/0249883 | A1* | 11/2006 | Oguma | B29C 70/44 |
| | | | | 264/339 |
| 2007/0194491 | A1 | 8/2007 | Krogager et al. | |
| 2008/0060755 | A1* | 3/2008 | Blanton | B29C 70/543 |
| | | | | 156/307.1 |
| 2014/0284836 | A1 | 9/2014 | Kline et al. | |
| 2014/0291889 | A1 | 10/2014 | Murai et al. | |
| 2015/0053332 | A1 | 2/2015 | Cano Cediel et al. | |
| 2015/0343716 | A1* | 12/2015 | Feeney | B29C 70/545 |
| | | | | 264/101 |
| 2019/0176412 | A1* | 6/2019 | Maeda | B29C 43/12 |
| 2019/0210306 | A1 | 7/2019 | Tokutomi | |
| 2020/0055266 | A1* | 2/2020 | Hirabayashi | B29C 43/3607 |
| 2020/0114597 | A1* | 4/2020 | Meure | B29C 70/48 |

FOREIGN PATENT DOCUMENTS

| | | | |
|---|---|---|---|
| JP | 2007-015351 A | | 1/2007 |
| JP | 2008-230020 A | | 10/2008 |
| JP | 2010-120167 A | | 6/2010 |
| JP | 2010120167 | * | 6/2010 |
| JP | 2011-083975 A | | 4/2011 |
| WO | 2017/022667 A1 | | 2/2017 |
| WO | 2018/047869 A1 | | 3/2018 |

OTHER PUBLICATIONS

International Search Report and Written Opinion in corresonding International Application No. PCT/JP2016/082671, dated Dec. 27, 2016 (11 pages).
Extended European Search Report in corresponding European Application No. 16886428.8, dated Nov. 16, 2018 (6 pages).
Office Action issued in corresponding Canadian Application No. 3,035,953, dated Apr. 9, 2020 (6 pages).
International Search Report and Written Opinion in corresponding International Application No. PCT/JP2017/032140, dated Oct. 3, 2017 (18 pages).
Office Action in corresponding Canadian Application No. 3,006,425, dated Apr. 15, 2019 (5 pages).
Office Action in corresponding U.S. Appl. No. 15/799,975, dated Jun. 17, 2019 (21 pages).

* cited by examiner

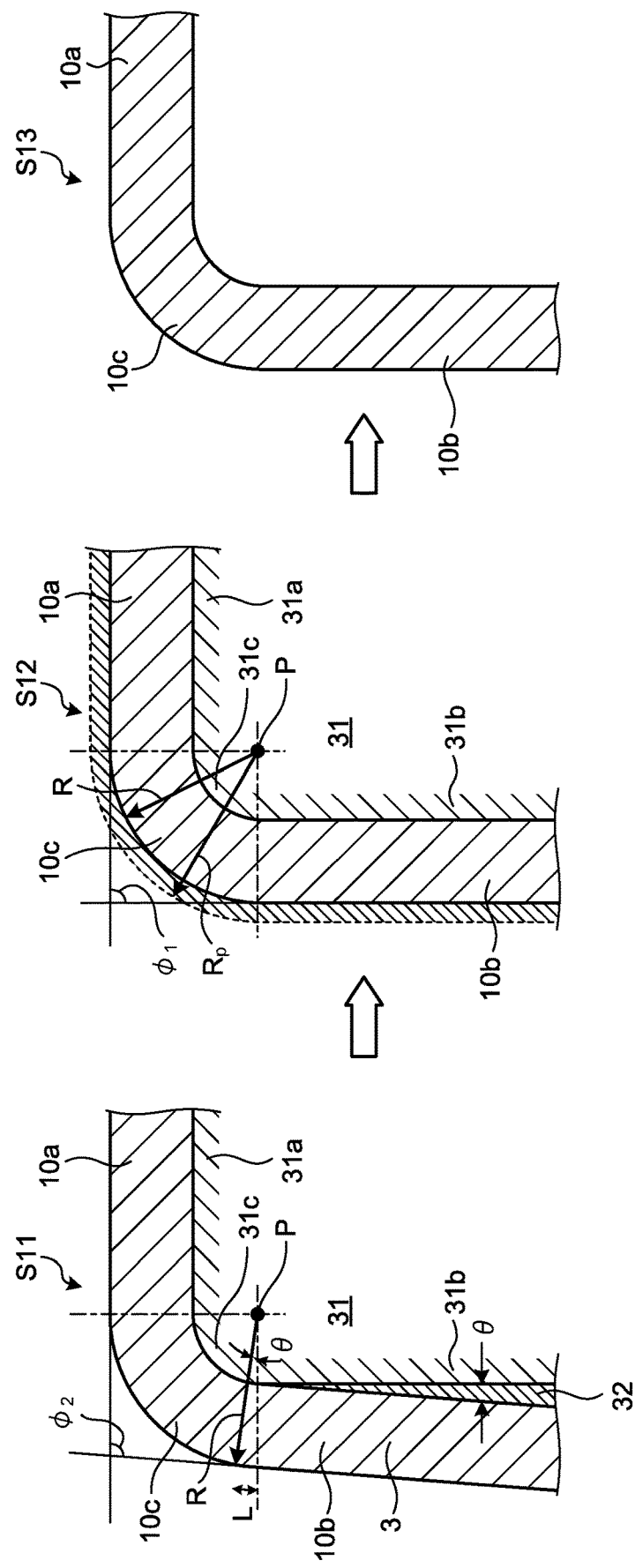

METHOD FOR MOLDING COMPOSITE MATERIAL AND JIG FOR MOLDING COMPOSITE MATERIAL

FIELD

The present invention relates to a method for molding a composite material in which curved corners are formed, and a jig for molding a composite material.

BACKGROUND

Methods for manufacturing preforms, which are molded by bringing a fiber reinforced laminated body into close contact with a shaping mold serving as a male mold, have conventionally been known as a method for molding a composite material in which curved corners are formed (see Patent Literature 1, for example). The male mold used in this manufacturing method has a top face, shoulders, and side faces. When pressure is applied to the fiber reinforced laminated body sequentially from the top face toward the side faces thereof in order to bring the fiber reinforced laminated body into close contact with the male mold, pressure is applied to the fiber reinforced laminated body sequentially from the top face to the shoulders thereof after pressure is applied to the fiber reinforced laminated body sequentially from the shoulders to the side faces thereof, in the manufacturing method.

CITATION LIST

Patent Literature

Patent Literature 1: Japanese Unexamined Patent Application Publication No. 2010-120167

SUMMARY

Technical Problem

Herein, in the manufacturing method of Patent Literature 1, both sides of the flat fiber reinforced laminated body are curved, thereby forming the top face, the shoulders, and the side faces, to shape a preform. While pressure is applied to the fiber reinforced laminated body, which is curved to form the shoulders, from outside the fiber reinforced laminated body as a whole, resin is then cured. With pressure applied from outside the fiber reinforced laminated body, the shoulders of the fiber reinforced laminated body particularly have a high pressure, so that the shoulders have a small thickness. At this time, the perimeter on the outer side of the fiber reinforced laminated body in the thickness direction becomes short. When the perimeter on the outer side in the thickness direction is short, an excess is generated by the shortened amount of the fiber reinforced laminated body. The excess causes wrinkles of the fiber and thickening of the outside diameter to occur easily on the outer side of the shoulders of the fiber reinforced laminated body, which makes it difficult to prevent poor molding from occurring.

It is, therefore, an object of the present invention to provide a method for molding a composite material and a jig for molding a composite material that are capable of appropriately preventing poor molding from occurring in curved corners.

Solution to Problem

A method for molding a composite material according to the present invention is a method for molding a composite material in which a curved corner is formed between two planes by using a molding jig. The molding jig includes a male mold that abuts on an inner side of the corner and that abuts on the two planes; and a correction member that is provided in an area on which one of the planes of the mold abuts to correct a bending angle of the corner, the bending angle being an angle formed by the two planes. The method includes a first shaping step of shaping a laminated body in such a manner that a thickness of the laminated body is decreased from an outer side toward an inner side of the corner, by using the molding jig in which the angle formed by the two planes is a first bending angle, the laminated body including fiber sheets laminated so as to have the corner curved at the first bending angle; and a second shaping step of shaping the laminated body in such a manner that the thickness of the laminated body is decreased from the outer side toward the inner side of the corner by curving the corner of the laminated body so as to form a second bending angle, by using the molding jig in which the angle formed by the two planes is the second bending angle smaller than the first bending angle.

According to this structure, the perimeter on the outer sides of the corners is shortened, with the thickness of the laminated body that has the corners forming the first bending angle being decreased from the outer sides toward the inner sides of the laminated body, in the first shaping step. The perimeter on the outer sides of the corners can be elongated by curving the laminated body at the second bending angle, in the second shaping step. In this manner, a tension placed in advance can offset a difference between actual lengths of the inner and outer sides caused when the thickness of the laminated body is densified during molding after the shaping in the first shaping step, in the second shaping step. Thus, wrinkles can be appropriately prevented from occurring on the outer sides of the corners of the laminated body, and poor molding can be prevented from occurring in the corners. Also, the same male mold can be used in first shaping step and the second shaping step, so that the laminated body can be molded by changing the molding jig from the first bending angle to the second bending angle by using the correction members, without moving the laminated body. Consequently, the work efficiency can be improved of forming the composite material that has the corners. The fiber sheets may be dry sheets that are shapeable, or may be a prepreg in which fiber sheets are impregnated with resin. In first shaping step, the flat laminated body in which the fiber sheets are laminated may be curved at the first bending angle to form the corners, or the fiber sheets may be laminated while being curved at the first bending angle to form the laminated body having the corners.

Further, it is preferable that the correction member is provided to the mold in a detachable manner, the correction member is attached to the mold so that the corner has the first bending angle in the first shaping step, and the correction member is removed from the mold so that the corner has the second bending angle in the second shaping step.

According to the structure, the bending angle of the corners can be easily changed between the first bending angle and the second bending angle by attaching and removing the correction members to and from the mold.

Further, it is preferable that the correction member is provided in a movable manner with respect to the mold, the correction member is moved with respect to the mold so that the corner has the first bending angle in the first shaping step, and the correction member is moved with respect to the mold so that the corner has the second bending angle in the second shaping step.

According to this structure, the bending angle of the corners can be easily changed between the first bending angle and the second bending angle by moving the correction members.

Further, it is preferable that the composite material is a spar having the corner that is molded so that the first bending angle is an obtuse angle larger than a right angle and the second bending angle is a right angle.

According to this structure, in a case in which the spar having the corners is molded, the composite material can be molded in which poor molding of the corners is appropriately prevented from occurring. The corners of the molded spar each have an angle slightly larger (slightly more open) than a right angle.

A jig for molding a composite material according to the present invention is a jig for molding a composite material to form a composite material in which a curved corner is formed between two planes. The jig for molding a composite material includes a male mold that abuts on an inner side of the corner and that also abuts on the two planes; and a correction member that is provided in an area on which one of the planes of the mold abuts to correct a bending angle of the corner, the bending angle being an angle formed by the two planes.

According to this structure, the bending angle can be easily corrected by using the correction members. Consequently, the composite material can be molded in which wrinkles and thickening are appropriately prevented from occurring in the corners by correcting the bending angle to have the second bending angle smaller than the first bending angle after the corners have the first bending angle.

Further, it is preferable that the correction member is provided to the mold in a detachable manner, is attached to the mold so that the corner has a first bending angle, and is removed from the mold so that the corner has a second bending angle smaller than the first bending angle.

According to this structure, the bending angle of the corners can be easily changed between the first bending angle and the second bending angle by attaching and removing the correction members to and from the mold.

Further, it is preferable that the correction member is provided to the mold in a movable manner so that the corner has the first bending angle or the second bending angle.

According to this structure, the bending angle of the corners can be easily changed between the first bending angle and the second bending angle by moving the correction members.

BRIEF DESCRIPTION OF DRAWINGS

FIG. 4 is a view illustrating the method for molding a composite material according to the present embodiment.

DESCRIPTION OF EMBODIMENTS

An embodiment according to the present invention is described in detail below with reference to the drawings. The invention is not limited by the embodiment. Components in the embodiment described below include those that are easy and can be replaced by a person skilled in the art, or those that are substantially the same. Furthermore, the components described below may also be combined as appropriate, and, if there are a plurality of embodiments, the embodiments may be combined.

First Embodiment

A method for molding a composite material 1 according to the first embodiment is a method for molding the composite material 1 that is a component of an airframe of an aircraft, for example. An example of the composite material 1 includes a spar 10 illustrated in FIG. 1. Although a description is given with an application to the composite material 1 illustrated in FIG. 1 in the present embodiment, the application is not limited to the composite material 1.

Figure 1:
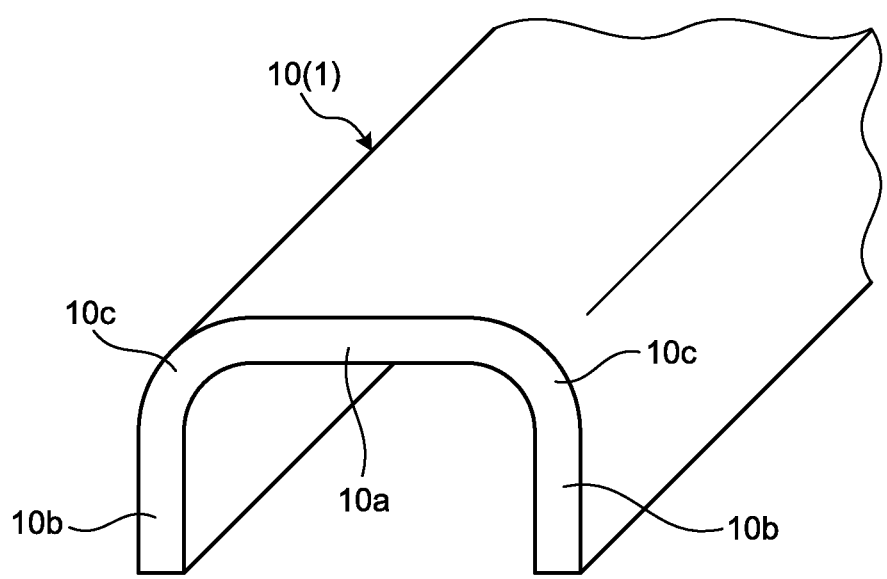
FIG. 1 is a perspective view illustrating a spar as an example of a composite material molded by a method for molding a composite material according to a present embodiment.
Figure 2:
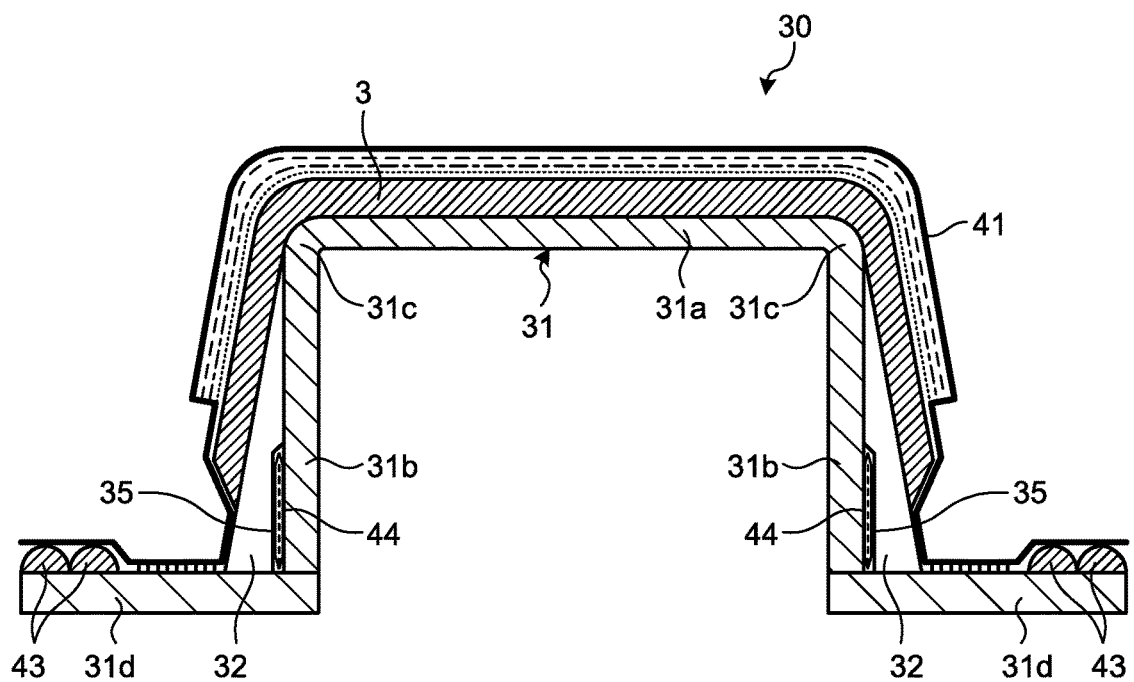
FIG. 2 is a schematic view illustrating a molding jig used in a first shaping step of the method for molding a composite material according to the present embodiment.
Figure 3:
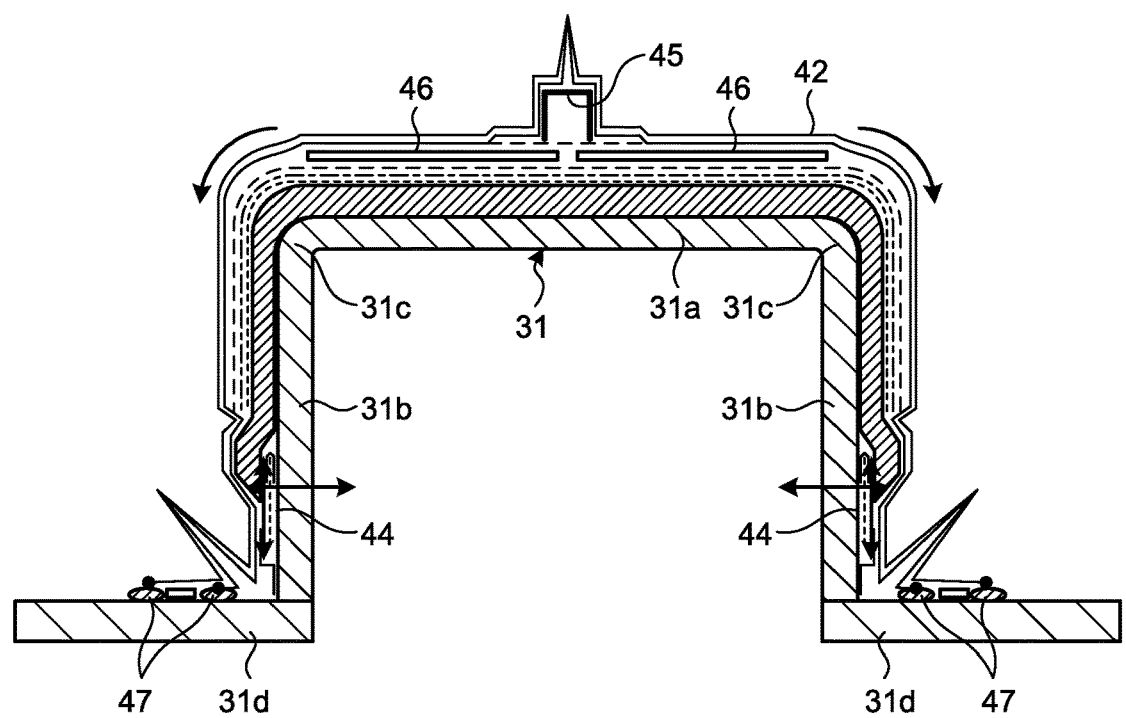
FIG. 3 is a schematic view illustrating a molding jig used in a second shaping step of the method for molding a composite material according to the present embodiment.

FIG. 1 is a perspective view illustrating a spar as an example of the composite material molded by the method for molding a composite material according to the present embodiment. FIG. 2 is a schematic view illustrating a molding jig used in a first shaping step of the method for molding a composite material according to the present embodiment. FIG. 3 is a schematic view illustrating a molding jig used in a second shaping step of the method for molding a composite material according to the present embodiment. FIG. 4 is a view illustrating the method for molding a composite material according to the present embodiment.

Prior to a description about the method for molding the composite material 1, the composite material 1 to be molded by the molding method is described with reference to FIG. 1. The composite material 1 illustrated in FIG. 1 is composed of carbon fiber reinforced plastic (CFRP). The composite material 1 is molded by molding a laminated body 3 in which fiber sheets both sides of which are bent are laminated, and then impregnating the bent laminated body 3 with resin and curing the bent laminated body 3. Resin having a bonding or adhesive function is intervened between layers of the fiber sheets of the laminated body 3.

For the spar 10 illustrated in FIG. 1, the laminated body 3 has corners 10c formed by curving both ends of the spar 10 in the width direction. In other words, the spar 10 has a central part 10a in the width direction, a pair of side faces 10b that are formed on both sides of the central part 10a in the width direction and that are substantially normal to the central part 10a, and a pair of corners 10c formed between the central part 10a and the respective side faces 10b. The central part 10a and the side faces 10b here are linear portions (planar portions) that are not curved. Thus, the corners 10c are each formed by being curved between the central part 10a and the respective side faces 10b serving as two planes. In this manner, for the spar 10 illustrated in FIG. 1, the laminated body 3 has the curved corners 10c formed by curving the side faces 10b with respect to the central part 10a to curve them two-dimensionally.

The spar 10 illustrated in FIG. 1 is molded by using a molding jig 30 illustrated in FIG. 2 and FIG. 3. As illustrated in FIG. 2 and FIG. 3, the molding jig 30 has a male mold 31 and a pair of correction members 32 provided to the mold 31 in a detachable manner. With the molding jig 30, the correction members 32 are attached to the mold 31, thereby molding the laminated body 3 that has the corners 10c curved at a first bending angle $\phi_2$, as illustrated in FIG. 4. Also, with the molding jig 30, the correction members 32 are detached from the mold 31, thereby molding the laminated body 3 that has the corners 10c curved at a second bending angle $\phi_1$ less than the first bending angle $\phi_2$. The first bending angle $\phi_2$ here is an angle formed by the outer surface of the central part 10a and the outer surfaces of the side faces 10b, and is an obtuse angle exceeding 90 degrees, for example. The second bending angle $\phi_1$ is an angle formed by the outer surface of the central part 10a and the outer surfaces of the side faces 10b, and is at an angle of 90 degrees (right angle), for example.

The mold 31 is a male mold on which the inner surfaces of the corners 10c abut, as illustrated in FIG. 3. The mold 31 is used to mold the laminated body 3 having the corners 10c curved at the second bending angle $\phi_1$, as well as to densify and shape the laminated body 3 in such a manner that the thickness of the laminated body 3 is decreased from the outer sides toward the inner sides of the corners 10c.

Specifically, the mold 31 has a top face 31a, a pair of side faces 31b that are provided on both sides of the top face 31a in the width direction and that are at the second bending angle $\phi_1$ with respect to the top face 31a, and a pair of corners 31c formed between the top face 31a and the respective side faces 31b. The mold 31 also has a pair of lower faces 31d provided below the side faces 31b.

On the outside face of the top face 31a, the inner side of the central part 10a of the laminated body 3 abuts. On the outside faces of the side faces 31b, the respective inner sides of the side faces 10b of the laminated body 3 abut. On the outside faces of the corners 31c, the respective inner sides of the corners 10c of the laminated body 3 abut. Thus, the mold 31 abuts on the inner sides of the corners 10c of the laminated body 3, so that a change in the perimeter on the inner sides of the corners 10c is curbed. With the mold 31, the laminated body 3 is shaped in such a manner that the thickness of the laminated body 3 is decreased from the outer sides toward the inner sides of the corners 10c.

The correction members 32 are members for correcting the bending angles of the corners 10c, and are attachable and detachable to and from the respective side faces 31b of the mold 31. The correction members 32 are each tapered down (wedge-shaped) from the lower faces 31d of the mold 31 toward the corners 31c thereof in the width direction. In other words, the correction members 32 each have a shape in which the tip thereof on the side of the corner 31c has a tip angle $\theta$ (see FIG. 4). The correction members 32 are each provided abutting on the respective side faces 31b and the respective lower faces 31d of the mold 31. The correction members 32 are provided extending in the longitudinal direction of the spar 10 (the anterior-posterior direction in FIG. 2), and the correction members 32 are removed by pulling out the correction members 32 in the longitudinal direction, for example.

Mold release treatment is applied to the face of each correction member 23 on which the laminated body 3 abuts, enabling easy removal of the correction member 32. The correction members 23 may be composed of mold release materials, such as a silicone and Teflon (registered trademark). Each correction member 23 has a groove 35 for suction ports that accommodates a suction port 44, which will be described later, formed in an area on the side of the lower face 31d abutting on the corresponding side face 31b. Depending on the method for molding a composite material, the grooves 35 for suction ports may be provided when necessary, or may be omitted when unnecessary. Specifically, the grooves 35 for suction ports are necessary in a case in which the method for molding a composite material is vacuum assisted resin transfer molding (VaRTM), whereas the grooves 35 for suction ports are sometimes unnecessary for a molding method using a prepreg or resin transfer molding (RTM).

The molding jig 30 is covered with a reusable film 41 when the correction members 32 are attached to the mold 31, as illustrated in FIG. 2. The film 41 is a film composed of silicone rubber or the like. The film 41 covers the laminated body 3 placed on the mold 31 and the correction members 32, and also seals the inside thereof airtightly with sealing materials 43 disposed in gaps with the lower faces 31d of the mold 31. The internal atmosphere of the film 41 that has been sealed airtightly is then evacuated through suction ports (not illustrated) provided to the lower faces 31d, and the laminated body 3 is also heated by a heater (not illustrated), thereby being densified. It is desired that two layers of a release film, peel ply, and the like be sandwiched between the film 41 and the laminated body 3 in order to help interlayer slip. Heating the laminated body 3 by the heater causes resin between the layers of the fiber sheets of the laminated body 3 to melt. Consequently, the resin between the layers retains the shape of the densified laminated body 3 in an environment in which vacuum is released, so that the laminated body 3 can be prevented from returning to that before densification in shape.

With the mold 31 to which the correction members 32 are attached, the flat laminated body 3 in which the fiber sheets are laminated may be curved at the first bending angle $\phi_2$ to form the corners 10c, or the fiber sheets may be laminated while being curved at the first bending angle $\phi_2$ to form the laminated body 3 having the corners 10c.

The mold 31 is covered with a bagging film 42 when the correction members 32 are removed from the mold 31, as illustrated in FIG. 3. The bagging film 42 is a film made of resin, such as nylon. The bagging film 42 covers the laminated body 3 placed on the mold 31, and also seals the inside thereof airtightly with sealing materials 47 disposed in gaps with the mold 31. While the internal atmosphere of the bagging film 42 that has been sealed airtightly is evacuated through suction ports 44, a resin material is then charged from a resin injection port 45 disposed above the top face 31a, and the resin material is heated by a heater (not illustrated), thereby being cured by heat, which forms the spar 10. At this time, protective plates 46 may be disposed between the resin injection port 45 and the laminated body 3. The protective plates 46 are disposed in order to form the central part 10a of the spar 10 smooth while preventing poor molding arising from the resin injection port 45 coming into contact with the laminated body 3.

The method for molding a composite material is described next with reference to FIG. 4. The method for molding a composite material is a molding method using dry fiber sheets, and vacuum assisted resin transfer molding (VaRTM), resin transfer molding (RTM), infusion molding, and the like are applicable. In the following description, a case is described in which the spar 10 illustrated in FIG. 1 is molded.

As illustrated in FIG. 4, the laminated body 3 is first molded that has the corners 10c curved at the first bending angle $\phi_2$ by being patterned after the shape of the mold 31 to which the correction members 32 are attached, in this molding method (Step S11: first shaping step). Specifically, the laminated body 3 is formed so that the perimeter on the outer sides of the corners 10c is a given radius of curvature centering on a center point P in the first shaping step S11. In other words, the areas curved with the given radius of curvature constitute the corners 10c of the laminated body 3. The laminated body 3 is heated under vacuum and the laminated body 3 is densified, so that the thickness of the laminated body 3 is decreased from the outer sides toward the inner sides of the corners 10c in the first shaping step S11. At this time, the laminated body 3 is formed to have a thin thickness so that the perimeter on the outer sides of the corners 10c is the given radius R of curvature centering on the center point P in the first shaping step S11.

Subsequently, the correction members 32 are removed from the mold 31, and the corners 10c of the laminated body 3 are curved so as to form the second bending angle $\phi_1$ (right angle) that is less than the first bending angle $\phi_2$, by being patterned after the shape of the mold 31 from which the correction members 32 are removed (Step S12: second shaping step). The laminated body 3 is heated under vacuum and the laminated body 3 is densified, so that the thickness of the laminated body 3 is decreased from the inner sides toward the outer sides of the corners 10c in the second shaping step S2. In this manner, a tension placed in advance offsets a difference between actual lengths of the inner and outer sides caused when the thickness of the laminated body 3 is densified after the shaping the first shaping step S11, in the second shaping step S2.

While resin is infused into the laminated body 3, the resin is cured by heat under high temperature and high pressure conditions, thereby forming the spar 10 in the second shaping step S2 (Step S13). The formed spar 10 has a radius R of curvature in the perimeter on the outer sides thereof, and has a shape in which the bending angle formed by the central part 10a and the side faces 10b is a right angle.

The perimeter on the outer sides of the corners 10c of the laminated body 3 is now described. In a case in which the thickness is decreased so that a given radius $R_P$ of curvature is changed to the radius R of curvature centering on the center point P, with the corners 31c having the second bending angle $\phi_1$ as in a conventional method (Step S12 in FIG. 4), an excess length L in the perimeter on the outer sides of the corners 10c is calculated by Equation (1) described below.

$$L = \pi/2 (R_P - R) \quad (1)$$

Consequently, the tip angle $\theta$ of the correction members 32 is calculated by Equation (2) described below so as not to generate the excess length L by elongation (Step S11 in FIG. 4).

$$\theta = (L/2\pi R) \times 2\pi \times (180°/\pi) \quad (2)$$

Thus, in the perimeter on the outer sides of the corners 10c of the laminated body 3, the excess length L generated on the outer sides of the corners 10c of the laminated body 3 by decreasing the thickness thereof can be elongated by attaching and detaching the correction members 32 that form the tip angle $\theta$ and curving the corners 10c from the first bending angle $\phi_2$ to the second bending angle $\phi_1$. The tip angle $\theta 0$ of the correction members 32 may be an angle slightly different from, that is, an angle larger or smaller than the angles calculated by Equations (1) and (2), as a result of conducting tests, for example.

As described above, according to the present embodiment, densification of the laminated body 3 can be facilitated while the perimeter on the outer sides of the corners 10c is shortened, with the thickness of the laminated body 3 that has the corners 10c forming the first bending angle $\phi_2$ being decreased from the outer sides toward the inner sides of the laminated body 3, in the first shaping step S11. The perimeter on the outer sides of the corners 10c can be elongated by curving the laminated body 3 at the second bending angle $\phi_1$, in the second shaping step S12. In this manner, the excess length L of the laminated body 3 generated by shortening the perimeter on the outer sides of the corners 10c in the first shaping step S11 is elongated by stretching the perimeter on the outer sides of the corners 10c in the second shaping step S12, whereby the generated excess portion of the laminated body 3 can be offset. Thus, wrinkles can be appropriately prevented from occurring on the outer sides of the corners 10c of the laminated body 3, and poor molding can be prevented from occurring in the corners 10c. Also, the same male mold 31 can be used in first shaping step S11 and the second shaping step S12, so that the laminated body 3 can be molded by changing the molding jig 30 from the first bending angle $\phi_2$ to the second bending angle $\phi_1$ by using the correction members 32, without moving the laminated body 3. Consequently, the work efficiency can be improved of forming the composite material 1 that has the corners 10c.

According to the present embodiment, the bending angle of the corners 31c of the mold 31 can be easily changed between the first bending angle $\phi_2$ and the second bending angle $\phi_1$ by attaching and removing the correction members 32 to and from the mold 31. A method may be such that a mold having the first bending angle $\phi_2$ and a mold having the second bending angle $\phi_1$ are used individually.

According to the present embodiment, even when the spar 10 the corners 10c of which each have a substantially right bending angle is molded, the spar 10 can be molded in which poor molding is appropriately prevented from occurring in the corners 10c. The corners 10c of the molded spar 10 each have an angle slightly larger (slightly more open) than a right angle.

Although dry carbon fiber sheets are used to form the laminated body 3 in the present embodiment, fiber sheets are not limited to carbon fiber, and may be of other materials, such as glass fiber and aramid fiber. Furthermore, a prepreg may be used in which fiber sheets are impregnated with resin in advance.

Although the description has been given with an application to the spar 10 in which the corners 10c have a substantially right angle in the present embodiment, the composite material 1 to be applied is not particularly limited. For example, the composite material 1 may be the spar 10 in which the corners 10c have an angle of about 80 degrees to 110 degrees, or application to a Z-shaped longeron in which the corners 10c have an angle of about 45 degrees. Even for a composite material in which the corners 10c have an angle of 45 degrees, the second bending angle $\phi_1$ is smaller than the first bending angle $\phi_2$, the first bending angle $\phi_2$ does not need to be an obtuse angle, and the second bending angle $\phi_1$ is less than a right angle.

Although the bending angle of the corners 31c is changed from the first bending angle $\phi_2$ to the second bending angle $\phi_1$ by attaching and detaching the correction members 32 to and from the mold 31 in the present embodiment, the structure is not limited thereto. The structure may be such that correction members 32 are provided in a movable manner with respect to the mold 31. In other words, the correction members 32 may be moved with respect to the mold 31 in a position in which the corners 31c have the first bending angle $\phi_2$ in the first shaping step S11, and the correction members 32 may be moved with respect to the mold 31 in a position in which the corners 31c have the second bending angle $\phi_1$ in the second shaping step S12. According to this structure, the bending angle of the corners 31c can be easily changed between the first bending angle $\phi_2$ and the second bending angle $\phi_1$ by moving the correction members 32. In this case, a resin film having releasability may be disposed between the laminated body 3 and the mold 31 in order to prevent the inflow of resin into the removable portions and improve releasability.

REFERENCE SIGNS LIST

1 Composite material
3 Laminated body
10 Spar
10a Central part
10b Side faces
10c Corners
30 Molding jig
31 Mold
31a Top face
31b Side faces
31c Corners
31d Lower faces
32 Correction members
35 Grooves for suction ports
41 Film
42 Bagging film
43 Sealing materials
44 Suction ports
45 Resin injection port
46 Protective plates
47 Sealing materials
$\phi_2$ First bending angle
$\phi_1$ Second bending angle

The invention claimed is:

1. A method for molding a composite material in which a curved corner is formed between two planes by using a molding jig, and in which fiber sheets are laminated, wherein the molding jig includes a male mold that abuts on an inner side of the curved corner and that abuts on the two planes and includes a correction member that is provided in an area on which one of the planes of the mold abuts to correct a bending angle of the curved corner where the bending angle is an angle formed by the two planes, the method comprising:
   first shaping a laminated body constituting the composite material in such a manner that a thickness of the laminated body is decreased from an outer side toward an inner side of the curved corner, by using the molding jig in which the angle formed by the two planes is a first bending angle, the laminated body including the fiber sheets laminated so as to have the curved corner curved at the first bending angle; and
   second shaping the laminated body in such a manner that the thickness of the laminated body is decreased from the outer side toward the inner side of the curved corner by curving the curved corner of the laminated body so as to form a second bending angle, by using the molding jig in which the angle formed by the two planes is the second bending angle smaller than the first bending angle, wherein
   the correction member has a tip with a tip angle θ on a side of a corner of the mold,
   when a radius $R_P$ of curvature of a perimeter on an outer side of the curved corner is configured to decrease to a radius R of curvature in the second shaping, a decreasing length L in the perimeter on the outer side of the curved corner is acquired by a formula (1):

$$L=\pi/2(R_P-R) \qquad (1), \text{ and}$$

the tip angle θ is set by a formula (2):

$$\theta=L/R_1 \qquad (2),$$

where $R_1$ is a radius of curvature of the perimeter on the outer side of the curved corner after the first shaping.

2. The method for molding a composite material according to claim 1, wherein
   the correction member is provided to the mold in a detachable manner,
   the correction member is attached to the mold so that the curved corner has the first bending angle in the first shaping, and
   the correction member is removed from the mold so that the curved corner has the second bending angle in the second shaping.

3. The method for molding a composite material according to claim 1, wherein
   the correction member is provided in a movable manner with respect to the mold,
   the correction member is moved with respect to the mold so that the curved corner has the first bending angle in the first shaping, and
   the correction member is moved with respect to the mold so that the curved corner has the second bending angle in second the shaping.

4. The method for molding a composite material according to claim 1, wherein the composite material is a spar having the curved corner that is molded so that the first bending angle is an obtuse angle larger than a right angle and the second bending angle is a right angle.

5. A jig for molding a composite material to form the composite material in which a curved corner is formed between two planes, and in which fiber sheets are laminated, the jig for molding a composite material comprising:
   a male mold that abuts on an inner side of the curved corner and that also abuts on the two planes; and
   a correction member that is provided in an area on which one of the planes of the mold abuts to correct a bending angle of the curved corner, the bending angle being an angle formed by the two planes, wherein
   the correction member is provided to the mold in a detachable manner, is attached to the mold so that the curved corner has a first bending angle, and is removed from the mold so that the curved corner has a second bending angle smaller than the first bending angle,
   the correction member has a tip with a tip angle θ on a side of a corner of the mold,
   when a radius $R_P$ of curvature of a perimeter on an outer side of the curved corner is configured to decrease to a radius R of curvature in a procedure performed with the mold detached from the correction member, a decreasing length L in the perimeter on the outer side of the curved corner is acquired by a formula (1):

$$L=\pi/2(R_P-R) \qquad (1), \text{ and}$$

the tip angle θ is set by a formula (2):

$$\theta=L/R_1 \qquad (2),$$

where $R_1$ is a radius of curvature of the perimeter on the outer side of the curved corner after a procedure performed with the mold attached to the correction member.

6. The jig for molding a composite material according to claim 5, wherein the correction member is provided to the mold in a movable manner so that the curved corner has the first bending angle or the second bending angle.

* * * * *